United States Patent
Regunathan (10) Patent No.: US 11,750,278 B2
(45) Date of Patent: Sep. 5, 2023

(54) SATELLITE TERMINAL POWER BACK-OFF

(71) Applicant: Hughes Network Systems, LLC, Germantown, MD (US)

(72) Inventor: Murali Regunathan, Washington, DE (US)

(73) Assignee: Hughes Network Systems, LLC, Germantown, MD (US)

( * ) Notice: Subject to any disclaimer, the term of this patent is extended or adjusted under 35 U.S.C. 154(b) by 232 days.

(21) Appl. No.: 17/132,115

(22) Filed: Dec. 23, 2020

(65) Prior Publication Data

US 2022/0200691 A1   Jun. 23, 2022

(51) Int. Cl.
| | |
|---|---|
| *H04B 7/185* | (2006.01) |
| *H04B 7/06* | (2006.01) |
| *H04W 52/24* | (2009.01) |
| *H04W 52/26* | (2009.01) |

(52) U.S. Cl.
CPC ......... *H04B 7/1855* (2013.01); *H04B 7/0693* (2013.01); *H04B 7/18543* (2013.01); *H04W 52/241* (2013.01); *H04W 52/265* (2013.01)

(58) Field of Classification Search
CPC ................ H04B 7/1855; H04B 7/0693; H04B 7/18543; H04B 7/18513; H04W 52/241; H04W 52/265
USPC ....................................................... 455/12.1
See application file for complete search history.

(56) References Cited

U.S. PATENT DOCUMENTS

| | | | | |
|---|---|---|---|---|
| 8,744,513 | B2* | 6/2014 | Chen ................... | H04W 52/367 |
| | | | | 455/120 |
| 2009/0175185 | A1* | 7/2009 | Laish ................. | H04B 7/18519 |
| | | | | 370/252 |
| 2013/0211715 | A1* | 8/2013 | Bae .......................... | G01S 5/16 |
| | | | | 701/469 |
| 2016/0278063 | A1* | 9/2016 | Zhang ............... | H04W 72/0473 |
| 2019/0293748 | A1* | 9/2019 | Gulati ................ | H04W 74/004 |

FOREIGN PATENT DOCUMENTS

CN           112039580 A     12/2020

OTHER PUBLICATIONS

International Search Report and Written Opinion for PCT/US2021/061690 dated Mar. 7, 2022 (12 pages).

* cited by examiner

*Primary Examiner* — Shaima Q Aminzay
(74) *Attorney, Agent, or Firm* — Bejin Bieneman PLC (57) ABSTRACT

A terminal computer includes a processor and a memory. The memory stores instructions executable by the processor to determine an initial power back-off value for establishing a communication link to a satellite as a function of a distance of a location of a satellite terminal antenna within a satellite beam footprint from a specified reference point within the satellite beam footprint, and to initiate communication with the satellite based on the determined initial power back-off value.

20 Claims, 7 Drawing Sheets

SATELLITE TERMINAL POWER BACK-OFF

BACKGROUND

Satellite communication is a wireless communication technology, e.g., for Internet access, enterprise intranet connectivity, TV (television) broadcasting services, etc. To initiate communication with a satellite, a satellite terminal performs a ranging process. In a ranging process, the satellite terminal estimates a transmission power needed to achieve a desired SNR (signal to noise ratio) in communication with a satellite gateway by transmitting bursts at a maximum power level of the terminal. The satellite terminal then adjusts the terminal power after receiving feedback from the satellite gateway. Typically, a ranging process causes undesirable interference due to transmissions at the maximum power level. Additionally, the bursts arriving at the satellite gateway may exceed a dynamic range of the satellite gateway and therefore may result in a failure to establish a communication link between the satellite terminal and a satellite gateway.

In some examples, a satellite gateway may provide an initial power back-off value to the satellite terminals for initialization of a ranging process. That is, the terminal uses the received back-off value to back-off from the maximum power for ranging, thereby estimating a power level needed to establish a communication link quicker and more accurately. However, the initial back-off value is a value for the entire footprint of the satellite beam resulting in problems during ranging process. Thus, there may still be causes of interference or of a failure to establish the communication link.

DETAILED DESCRIPTION

Introduction

Disclosed herein is a terminal computer including a processor and a memory. The memory stores instructions executable by the processor to determine an initial power back-off value for establishing a communication link to a satellite as a function of a distance of a location of a satellite terminal antenna within a satellite beam footprint from a specified reference point within the satellite beam footprint, and to initiate communication with the satellite based on the determined initial power back-off value.

The instructions may further include instructions to determine the initial power back-off value based on stored data including (i) distances from the specified reference point, and (ii) respective power back-off values, for a plurality of locations within the satellite beam footprint.

The instructions may further include instructions to determine a fitted curve having (i) a first axis specifying a distance of each location from the reference point within the satellite beam footprint, and (ii) a second axis specifying a respective power back-off value, and to determine the initial power back-off value based on the determined fitted curve.

The instructions may further include instructions to determine the terminal distance from the reference point within the satellite beam footprint, and to determine the power back-off value for the terminal based on the fitted curve and the determined terminal distance from the reference point.

The instructions may further include instructions to update the power back-off value for the terminal based on an environmental condition including a weather condition, and upon establishing the satellite communication link, to provide the updated power back-off value to a satellite gateway.

The instructions may further include instructions to store a first set of data including (i) location coordinates and (ii) respective power back-off values, for a plurality of first locations within a first area within the satellite beam footprint and a second set of data including (i) location coordinates and (ii) respective power back-off values, for a plurality of second locations within a second area within the satellite beam footprint, upon determining that the terminal antenna is located within the first area, determine the initial power back-off value based on the first set of stored data.

The instructions may further include instructions to identify a plurality of non-overlapping sectors within the satellite beam footprint, wherein the satellite beam footprint encompasses the plurality of non-overlapping sectors, to determine a respective fitted curve of power back-off value for each of the plurality of sectors, and to determine a power back-off value for the terminal location based on the respective fitted curve of the sector in which a terminal antenna is located.

The instructions may further include instructions to determine a first fitted curve for the first sector based on the first set of stored data and a second fitted curve for the second sector based on the second set of stored data.

Further disclosed herein is a system including a satellite gateway which includes a processor and a memory. The memory stores instructions executable by the processor to receive ranging data from a plurality of satellite terminals on Earth, data including a power back-off value and a location of each of the satellite terminals, wherein the plurality of satellite terminals are located within a satellite beam footprint, to determine a distance of each of the locations from a reference point of the satellite beam footprint, to determine a fitted curve having (i) a first axis specifying a distance of each location from the reference point within the satellite beam footprint, and (ii) a second axis specifying a respective power back-off value, and to transmit data specifying the fitted curve via the satellite beam.

The instructions may further include instructions to actuate a second plurality of satellite terminals to perform ranging with the satellite, to receive ranging data from the second plurality of satellite terminals, to update the fitted curve based on the received ranging data from the second plurality of satellite terminals, and to transmit data specifying the updated fitted curve via the satellite beam.

The instructions may further include instructions to select the second plurality of terminals upon determining that each of the second plurality of terminals are in an inactive operation status.

The system may further include a satellite terminal within the satellite beam footprint, programmed to determine an initial power back-off value for establishing a communication link to the satellite based on (i) the received data specifying the fitted curve, and (ii) a distance of a location of a satellite terminal antenna within a satellite beam footprint from a specified reference point within the satellite beam footprint, and to initiate communication with the satellite based on the determined initial power back-off value.

The instructions may further include instructions, upon determining a non-circular shape of the satellite beam footprint, identify a plurality of sectors within the satellite beam footprint, and determine a respective fitted curve of power back-off value for each of the plurality of sectors.

Further disclosed herein is a method, comprising determining an initial power back-off value for establishing a communication link from a satellite terminal to a satellite as a function of a distance of a location of a satellite terminal antenna within a satellite beam footprint from a specified reference point within the satellite beam footprint, and initiating communication with the satellite based on the determined initial power back-off value.

The method may further include determining the initial power back-off value based on stored data including (i) distances from the specified reference point, and (ii) respective power back-off values, for a plurality of locations within the satellite beam footprint.

The method may further include determining a fitted curve having (i) a first axis specifying a distance of each location from the reference point within the satellite beam footprint, and (ii) a second axis specifying a respective power back-off value; and determining the initial power back-off value based on the determined fitted curve.

The method may further include determining the terminal distance from the reference point within the satellite beam footprint, and determining the power back-off value for the terminal based on the fitted curve and the determined terminal distance from the reference point.

The method may further include updating the power back-off value for the terminal based on an environmental condition including a weather condition, and upon establishing the satellite communication link, providing the updated power back-off value to a satellite gateway.

The method may further include storing a first set of data including (i) location coordinates and (ii) respective power back-off values, for a plurality of first locations within a first area within the satellite beam footprint and a second set of data including (i) location coordinates and (ii) respective power back-off values, for a plurality of second locations within a second area within the satellite beam footprint, upon determining that the terminal antenna is located within the first area, determining the initial power back-off value based on the first set of stored data.

The method may further include identifying a plurality of non-overlapping sectors within the satellite beam footprint, wherein the satellite beam footprint encompasses the plurality of non-overlapping sectors, determining a respective fitted curve of power back-off value for each of the plurality of sectors, and determining a power back-off value for the terminal location based on the respective fitted curve of the sector in which a terminal antenna is located.

Exemplary System Elements

A satellite gateway may provide an initial power back-off (BO) value to satellite terminals for initialization of "ranging process." However, a transmission power for meeting a desired SNR for a satellite terminal may depend on a location of the satellite terminal within the footprint of a satellite beam. For example, a power back-off value for a terminal located at a center of a footprint of a satellite beam may be higher than a power back-off value for another terminal located at or near an edge (or perimeter) of the footprint of the same satellite beam. To improve efficiency and effectiveness of establishing a communication link with a satellite, as disclosed herein, a computer can be programmed to determine an initial power back-off value for establishing a communication link to a satellite as a function of a distance of a location of a satellite terminal antenna within a satellite beam footprint from a specified reference point within the satellite beam footprint, and to initiate (i.e., start or commence) communication with the satellite, based on the determined initial power back-off value.

Figure 1:
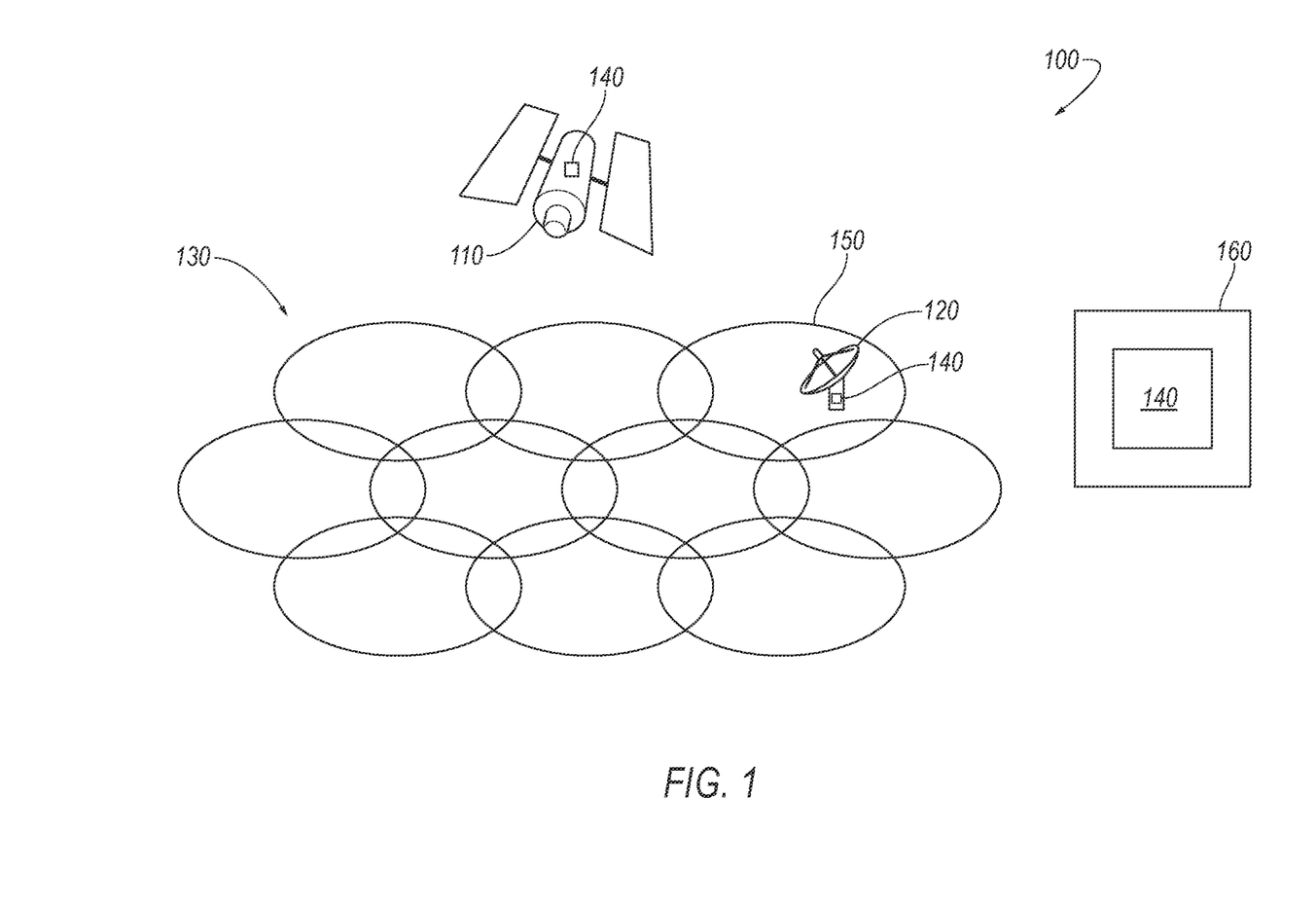
FIG. 1 illustrates an example satellite network.

With reference to FIG. 1, a satellite network 100 may include one or more satellites 110 providing satellite communication to terminals 120 located in a coverage area 130 of the satellite communication network 100. A coverage area 130 of a satellite communication network 100 includes a geographical area on the surface of Earth. A coverage area 130 of a satellite communication network 100 may include footprints 150 of one or more beams of one or more satellites 100 included in the satellite communication network 100. Locations on the surface of Earth, e.g., a location of a satellite terminal 120, may be specified based on a location coordinate system, e.g., a celestial coordinate system, as discussed with respect to FIG. 2.

Satellite 110 may include a computer 140 and an antenna communicating with terminals 120 via a satellite communication link. In the present context, a satellite link (or satellite communication link) may include an uplink, including communication from a terminal 120 or a satellite gateway 160 to a satellite 110 and a downlink, which includes communication from the satellite 110 to the gateway 160 or a terminal 120.

A satellite 110 antenna may communicate via one or more satellite beams having a respective beam footprint 150. In the present context, a beam footprint 150 of a satellite 110 is a geographical area on the surface of Earth, in which a terminal 120 may communicate with the satellite 110. A satellite 110 beam, in the present context, is a satellite 110 signal that is concentrated in power, sent by a high-gain antenna, and that therefore typically covers only a limited geographic area on Earth. Each satellite 110 may have any number (one or more) of beams that cover different parts of satellite network coverage area 130. Satellite 110 beams may overlap. A satellite beam footprint 150, i.e., including its dimensions and shape, is determined by a satellite 110 distance from the Earth and physical characteristics of the satellite 110 antenna such as antenna radiation pattern, etc. Each terminal 120 in a beam footprint 150 may receive data from the satellite 110 via a downlink 180 or send data to the satellite 110 via an uplink. A satellite 110 may service multiple terminals 120, e.g., in multiple geographical regions within the beam footprint 150. As discussed with respect to FIGS. 3 and 5, a satellite beam footprint 150 may have a circular shape or a non-circular shape, e.g., ovular, etc.

A computer 140 may be included in a satellite 110, a satellite gateway 160, and/or terminal(s) 120. A computer, as that term is used herein, refers to a machine including a processor and memory. A computer memory can be implemented via circuits, chips or other electronic components and can include one or more of read-only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store instructions executable by the processor and other data. The processor is implemented via circuits, chips, or other electronic component and may include one or more microcontrollers, one or more field-programmable gate arrays (FPGAs), one or more application specific integrated circuits (ASICs), one or more digital signal processors (DSPs), one or more customer-specific integrated circuits, etc. A processor in computer 140 may be programmed to execute instructions stored in a computer memory to carry out the actions of a satellite 110, terminal 120, gateway 160, etc., as discussed herein.

The terminals 120 (or satellite terminal 120), e.g., very small aperture terminals (VSAT), are computer-based communication devices implemented via circuits, chips, antennas, or other electronic components that can communicate with satellites 110 that are within communication range of the terminal 120. In some instances, the terminals 120 are stationary relative to a location on Earth. In other instances, the terminals 120 are mobile, meaning that the terminals 120 move relative to a location on the Earth. In some instances, the terminal 120 may provide an interface between a satellite 110 and other ground-based communication devices. For instance, the terminal 120 may receive communications from a satellite 110 and transmit such communications via terrestrial communication channels (i.e., between ground-based devices).

A terminal 120 includes one or more computers 140 to perform operations disclosed herein. A terminal 120 may include a modulator and a demodulator to facilitate communications with satellites 110. Moreover, each terminal 120 may have an encoder to encode outgoing data and/or a decoder to decode received data. A terminal 120 may include or be communicatively connected to one or more dish(s) including one or more antennas, which allow a terminal 120 to communicate with one or more satellites 110 at a time. A dish antenna may include a low-noise block downconverter (LNB) mounted on the dish, which may collect radio waves from the dish and convert the collected radio waves to a signal which is sent through a wired connection, e.g., a cable, to the terminal 120.

A satellite gateway 160 is a device including a computer 140 that is programmed to communicate with terminal(s) 120 via satellite(s) 110. A satellite gateway 160 may be connected to a traffic gateway via an IP communication interface and/or any other suitable wired or wireless communication interface.

Figure 2:
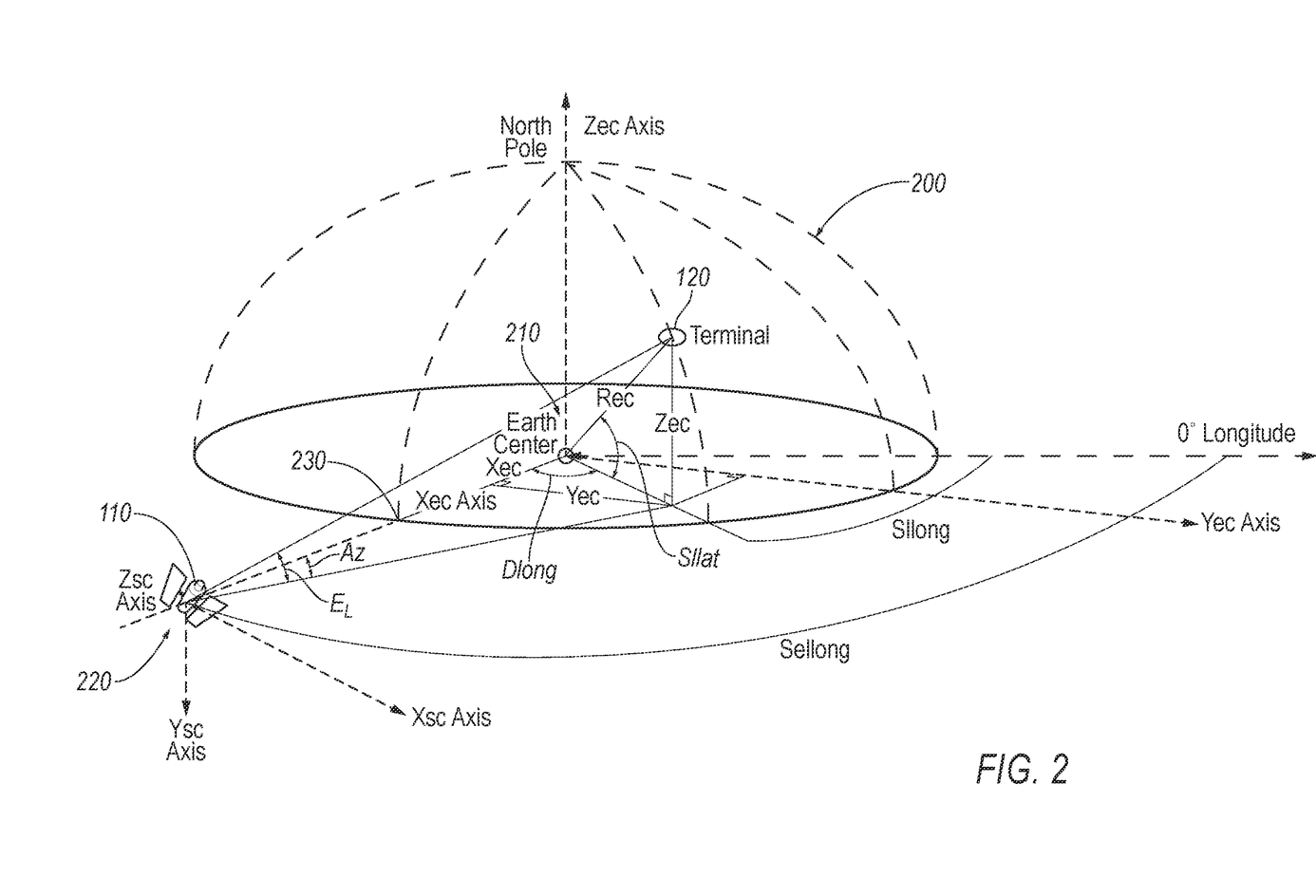
FIG. 2 illustrates celestial and geodetic coordinate systems.

FIG. 2 illustrates the satellite 110 above, and a terminal 120 on the surface of, Earth 200. In a celestial coordinate system 220, celestial coordinates specify a location on Earth 200 by an azimuth Az and elevation El (or altitude) of a location. The celestial location coordinates (Az, El) of a terminal 120 location may be determined by converting geodetic location coordinates $X_{EC}$, $Y_{EC}$, $Z_{EC}$ of the terminal 120 location, as discussed with respect to Equations (1)-(11). Geodetic location coordinates $X_{EC}$, $Y_{EC}$, $Z_{EC}$ are defined with respect to a geodetic coordinate system 210 having an origin point at Earth 200 center point. Geodetic location coordinates $X_{EC}$, $Y_{EC}$, $Z_{EC}$ may be determined based on GPS (global positioning system) coordinates of the terminal 120 location using conventional techniques. Equations (1a) and (1b) determine intermediate parameters $R_1$ and $R_2$, which are used in Equations (3) and (4) below.

$$R_1 \equiv \frac{a}{\sqrt{1-(2f-f^2)\sin^2\varphi}} + h \quad (1a)$$

$$R_2 \equiv \frac{a(1-f)^2}{\sqrt{1-(2f-f^2)\sin^2\varphi}} + h \quad (1b)$$

Parameter a represents an equatorial Earth 200 radius, i.e., 6378.2 kilometer (km). Flattening factor f is a measure of a compression of a circle or sphere defined as a difference in magnitude between a semi-major axis a and a semi-minor axis b divided by the semimajor axis a, or f=(a−b)/a, e.g., f is 0.003352811 for Earth. Parameter h (not shown) is a height of the terminal 120 location above Earth 200 surface. Parameter $\varphi$ is geodetic latitude in radians. With respect to the parameter h, maximum variations in the height h between the reference ellipsoid and mean sea level is about 100 meters (m). Equations (3)-(5) provide calculations of geodetic coordinates $X_{EC}$, $Y_{EC}$, $Z_{EC}$ based on the angles $\varphi$, $\lambda$. $R_{ORB}$ is a satellite 110 orbit height, e.g., 42164 km. Angles $\varphi$, $\lambda$ are defined based on Equations (2a) and (2b).

$$\lambda = (\text{Term}_{longitude} - \text{Satellite Longitude}) * 3.1415/180 \quad (2a)$$

$$\varphi = \text{Term}_{Latitude} * 3.1415/180 \quad (2b)$$

$$X_{EC} = R_1 \cos\varphi \cos\lambda' = R_{ORB} \quad (3)$$

$$Y_{EC} = R_1 \cos\varphi \sin\lambda' \quad (4)$$

$$Z_{EC} = R_2 \sin\varphi \quad (5)$$

Equations (6)-(9) provide a conversion of geodetic location coordinates $X_{EC}$, $Y_{EC}$, $Z_{EC}$ unit vector to an antenna coordinate $X_{AC}$, $Y_{AC}$, $Z_{AC}$ unit vector. A unit vector is a vector of length 1 (one), sometimes also called a direction vector. Parameter $\theta_X$ denotes a boresight 230 azimuth Az and parameter $\theta_Y$ denotes a boresight elevation El. The boresight 230 is an intersection point of a line extending from the satellite 110 to Earth 200 and perpendicular to a tangent to the point of intersection on the Earth's surface.

The satellite antenna boresight is determined by the center of a footprint, 150, as shown in FIG. 1. To accomplish this, the cell pattern is such that at a nominal orbit slot the boresight is such that the center of coverage is correctly determined.

$$A_X = \begin{bmatrix} \cos(\theta_X) & -\sin(\theta_X) & 0 \\ \sin(\theta_X) & \cos(\theta_X) & 0 \\ 0 & 0 & 1 \end{bmatrix} \quad (6)$$

$$A_Y = \begin{bmatrix} \cos(\theta_Y) & 0 & -\sin(\theta_Y) \\ 0 & 1 & 0 \\ \sin(\theta_Y) & 0 & \cos(\theta_Y) \end{bmatrix} \quad (7)$$

$$M_{EC \to AC} = A_Y A_X \quad (8)$$

$$\begin{bmatrix} X \\ Y \\ Z \end{bmatrix}_{AC} = M_{EC \to AC} \begin{bmatrix} X \\ Y \\ Z \end{bmatrix}_{EC} \quad (9)$$

The celestial location coordinates (Az, El) of a terminal 120 location may be determined using Equations (10)-(11).

$$El = \tan^{-1}\left(\frac{z_{AC}}{\sqrt{X_{AC}^2 + Y_{AC}^2}}\right) \quad (10)$$

$$Az = \tan^{-1}\left(\frac{-Y_{AC}}{X_{AC}}\right) \qquad (11)$$

Figure 3:
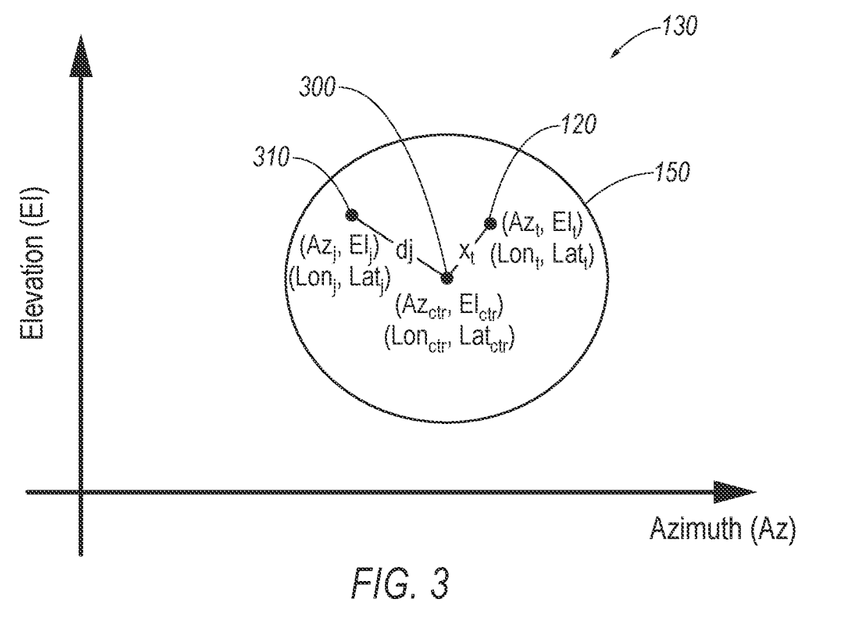
FIG. 3 illustrates a satellite beam footprint of FIG. 1 and a satellite terminal located within the footprint.

FIG. 3 shows an example footprint 150 within the coverage area 130, as discussed with respect to FIG. 1. A footprint 150 has a reference point 300, e.g., a geometrical center point of a circular-shaped footprint 150 on the ground surface. Alternatively, for a non-circular shaped footprint 150, the computer 140 may store location coordinates of a reference point 300 specified for the non-circular footprint 150. The coordinates of the reference point 300 may be specified with celestial coordinates $Az_{ctr}$, $El_{ctr}$, and planar coordinates including longitudinal and lateral coordinates $Long_{ctr}$, $Lat_{ctr}$, e.g., with respect to an origin such as GPS reference point. FIG. 3 shows a location of a terminal 120 with celestial coordinates $Az_t$, $El_t$ within the footprint 150 and Cartesian coordinates including longitudinal and lateral coordinates $Long_t$, $Lat_t$.

With reference to FIGS. 1 and 3, a computer 140, e.g., of the terminal 120, can be programmed to determine an initial power back-off value $y_t$ for establishing a communication link to a satellite 110 as a function of a distance $x_t$ of a location of a satellite terminal 120 antenna within a satellite beam footprint 150 from a specified reference point 300 within the satellite beam footprint 150, and to initiate communication with the satellite 110 based on the determined initial power back-off value $y_t$.

The computer 140 may be programmed to determine the initial power back-off value $y_t$ based on stored data including (i) distances $d_j$ from the specified reference point 300, and (ii) respective power back-off values $PBO_j$, for a plurality of locations 310 within the satellite beam footprint 150.

Table 1 shows an example set of data including longitudinal and lateral coordinates $Lon_j$, $Lat_j$ and respective power back-off values $PBO_j$, which can be used for determining the initial power back-off value $y_t$. The stored data, e.g., as shown in Table 1, includes data corresponding to n locations 310 on the ground surface within the footprint 150. For example, the locations 310 may include data corresponding to (i) the reference location 300, (ii) a location 310 on an edge (or perimeter) of the footprint 150, and (iii) a location 310 at a location between the perimeter of the footprint 150 and the reference point 300. The computer 140 may be programmed to calculate a distances $d_j$ of a location 310 from the reference point 300 based on the location coordinates $Lon_j$, $Lat_j$ of the location 310 and the location coordinates $Long_{ctr}$, $Lat_{ctr}$ of the reference point 300, as discussed below.

TABLE 1

| Point index | Longitude | Latitude | Power back-off values (PBO) |
|---|---|---|---|
| 1 | $Lat_1$ | $Lon_1$ | $PBO_1$ |
| 2 | $Lat_2$ | $Lon_2$ | $PBO_2$ |
| ... | | | |
| j | $Lon_j$ | $Lat_j$ | $PBO_j$ |
| ... | | | |
| n | $Lon_n$ | $Lat_n$ | $PBO_n$ |

With respect to Equation (12), the computer 140 may be programmed to calculate the distance $d_j$ of the $j^{th}$ location from the reference point 300. Additionally or alternatively, Equation (12) may be specified using longitudinal and lateral coordinates or geodetic location coordinates, as the coordinates can be converted from one to another.

$$d_j = \sqrt{(az_j - az_{ctr})^2 + (el_j - el_{ctr})^2} \qquad (12)$$

The computer 140 may be programmed to determine the terminal 120 distance $x_t$ from the reference point 300 within the satellite beam footprint 150, and to determine the power back-off value $y_t$ for the terminal 120 based on a fitted curve P, e.g., discussed below with respect to Equation (13b), and the determined terminal distance $x_t$ from the reference point 300. For example, with respect to Equation (13a), the computer 140 may be programmed to calculate the distance $x_t$ of the terminal 120 from the reference point 300 using celestial location coordinate. Additionally or alternatively, Equation (13a) may be specified using planar coordinates including longitudinal and lateral coordinates or geodetic location coordinates, as the coordinates can be converted from one to another.

$$x_t = \sqrt{(az_t - az_{ctr})^2 + (el_t - el_{ctr})^2} \qquad (13a)$$

Figure 4:
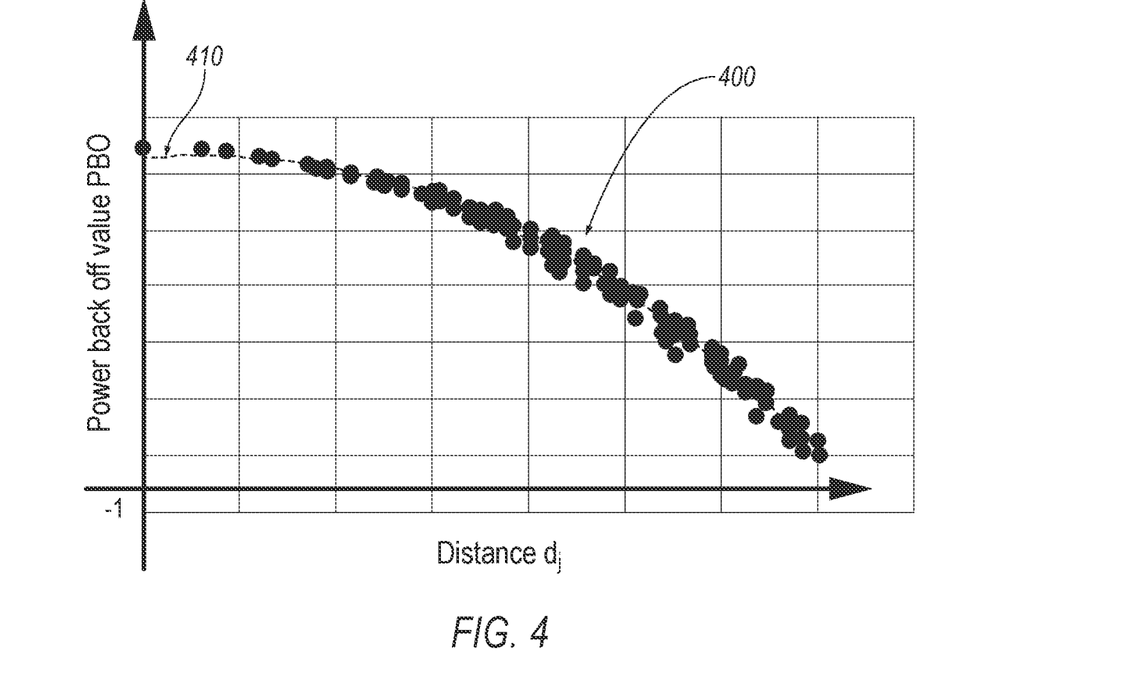
FIG. 4 is (i) a graph of power back-off values versus a terminal distance to a center of a circular satellite beam footprint, and (ii) a curve fitted to the graph.

With respect to FIG. 4, (i) a first graph 400 illustrates distances $d_j$ of locations 310 from the reference point 300 and corresponding power back-off values $PBO_j$, and a second graph 410 is a curve fitted to the first graph 400, e.g., using a conventional quadratic curve fitting technique as discussed below. As shown in FIG. 4, the power back-off value $PBO_j$ become higher when nearing a center point 300 of a footprint 150 (i.e., for shorter distances $d_j$), whereas the power back-off reduces as the distance $d_j$ increases, e.g., $PBO_j$ has a lower value at a perimeter of the footprint 150 compared to the center point 300.

As illustrated by FIG. 4, the computer 140 may be programmed to receive ranging data from multiple satellite terminals 120 on Earth, data including a power back-off value $PBO_j$ and a location of each of the satellite terminals 120. The terminals 120 are located within a satellite beam footprint 150. Ranging data, in the present context, is data sent by a terminal 120 to the satellite 110 upon completion of the ranging process and establishing the satellite link. The computer 140 may then determine a distance $d_j$ of each of the locations 310 from a reference point 300 of the satellite beam footprint 150, to determine a fitted curve P, e.g., Equation (13b), having (i) a first axis specifying a distance $d_j$ of each location from the reference point within the satellite beam footprint, and (ii) a second axis specifying a respective power back-off value $PBO_j$, and to transmit data specifying the fitted curve P via the satellite beam. The fitted curve P can be specified with parameters $p_1, p_2, p_3$.

$$y_t = P(x_t) = p_1 x_t^2 + p_2 x_t + p_3 \qquad (13b)$$

In one example, with reference to exemplary Table 1, the computer 140 may be programmed to receive location coordinates $Lon_j$, $Lat_j$ of n locations 310. The computer 140 may be programmed to implement Equation (12) to determine each of the distances $d_j$ for n locations 310 and determine parameters $p_1, p_2, p_3$ of a curve fitted based on the determined distances $d_j$ and respective power back-off values $PBO_j$, as discussed below. Additionally or alternatively, the computer 140 may be programmed to fit another type of curve, e.g., a third-degree polynomial, etc.

Equations (14) and (15) specify a polynomial P(x) determined based on data including n locations $x_j$ and corresponding power back of values $y_j$. Equation (16) shows an example polynomial P determined based on data including distances $x_1$, $x_2$, $x_3$ and respective power back-off values $y_1$, $y_2$, $y_3$.

$$V_j(x) = y_j \prod_{k=1, k \neq j}^{n} \frac{x - x_j}{x_j - x_k} \quad (14)$$

$$P(x) = \sum_{j=1}^{n} V_j(x) \quad (15)$$

$$P(x) = \left[ \frac{y1}{(x_1 - x_2)(x_1 - x_3)} + \frac{y2}{(x_2 - x_1)(x_2 - x_3)} + \frac{y3}{(x_3 - x_2)(x_3 - x_1)} \right] \quad (16)$$
$$x^2 + \left[ \frac{-(x_2 + x_3) * y1}{(x_1 - x_2)(x_1 - x_3)} + \frac{-y2 * (x_3 + x_1)}{(x_2 - x_1)(x_2 - x_3)} + \frac{-y3 * (x_1 + x_2)}{(x_3 - x_2)(x_3 - x_1)} \right] x + \left[ \frac{(x_2 x_3) y1}{(x_1 - x_2)(x_1 - x_3)} + \frac{y2 * (x_3 x_1)}{(x_2 - x_1)(x_2 - x_3)} + \frac{y3 * (x_1 x_2)}{(x_3 - x_2)(x_3 - x_1)} \right]$$

The terminal 120 computer 140 may be programmed to store a first set of data including (i) location coordinates, e.g., distance dj, planar location coordinates $Lon_j$, $Lat_j$, etc., and (ii) respective power back-off values $y_j$, for multiple locations within a first beam footprint 150 within the satellite coverage area 130 and a second set of data including (i) location coordinates e.g., distance dj, planar location coordinates $Lon_j$, $Lat_j$, etc., and (ii) respective power back-off values $y_j$, for multiple locations within a second beam footprint 150 within the satellite coverage area 130. The computer 140 may be programmed, upon determining that the terminal 120 antenna is located within the first beam footprint 150, to determine the initial power back-off value $y_t$ based on the first set of stored data 150.

The computer 140 may be programmed to receive data such as shown in example Table 1 for multiple footprints 150 such as shown in FIG. 1. The computer 140 may receive data for n locations 310 in a first footprint 150 and data for q locations in a second footprint 150. The computer 140 may then fit a first curve specified with parameters $p_{1n}$, $p_{2n}$, $p_{3n}$ for the first footprint 150 and fit a second curve specified with parameters $p_{1q}$, $p_{2q}$, $p_{3q}$ for the second footprint. For example, upon receiving data for k footprints, the computer 140 may determine k sets of parameters specifying k fitted curves P. In one example, a gateway computer 140 may be programmed to receive the locations 310 of multiple footprints 150 in a coverage area 130 (e.g., as shown in FIG. 1), to determine a set of parameters $p_1$, $p_2$, $p_3$ for each footprint 150, and to broadcast the sets of parameters $p_1$, $p_2$, $p_3$. The gateway 160 computer 140 may be programmed to send parameters $p_1$, $p_2$, $p_3$ of each footprint 150 via a respective satellite 110 beam to terminals 120 within respective footprint 150.

Satellite communications may be affected by environmental conditions such as a weather condition, e.g., snow, rain, wind, etc. In one example, a computer 140 may be programmed to update the power back-off value $y_t$ for the terminal 120 based on an environmental condition, and, upon establishing the satellite communication link, to provide the updated power back-off value $y_t$ to a satellite gateway 160. In other words, the terminal 120 computer 140 may store a back-off value $y_t$ determined by using Equation (13b) and then update the stored value $y_t$ based on the environmental conditions. The terminal 120 computer 140 may then transmit the updated back-off value $y_t$ to the satellite 110 via the uplink upon establishing the satellite link.

The gateway 160 computer 140 may receive multiple updated back-off values $y_t$ from terminals 120 at various locations 310 in the beam footprint 150. With respect to example graph 400 of FIG. 4, the updated back-off values $y_t$ present an updated graph 400 (not shown). Thus, a new curve should be fitted to determine an updated set of parameters $p_1$, $p_2$, $p_3$. The computer 140 may be programmed to determine an updated set of parameters $p_1$, $p_2$, $p_3$ and broadcast the updated parameters $p_1$, $p_2$, $p_3$ to the terminals 120 in the beam footprint 150. Thus, upon receiving an updated set of parameters $p_1$, $p_2$, $p_3$, a terminal 120 computer 140 may determine an updated power back-off value $y_t$.

To establish a satellite link between a terminal 120 and a satellite 110, the computer 140 may be programmed to implement Equation (17) to determine a modified initial back-off value $backoff_{S_p M_q C_r}$, e.g., specified in dB (decibel), based on the determined initial power back-off value $y_t$, symbol rate $S_p$, modulation mode $M_q$, and the coding rate $C_r$.

$$backoff_{S_p M_q C_r} = y_t - 10 * \log_{10} S_{baseline} + 10 * \log_{10} S_p - SNRTarget_{M_{baseline} C_{baseline}} + SNRTarget_{M_q C_r} \quad (17)$$

$S_p$ is a symbol rate, e.g., 256 ksps (kilo sample per second), 512 ksps, 1024 ksps, 2048 ksps, 4096 ksps, 8192 ksps, 12288 ksps, and 16384 ksps. $M_q$ is a modulation mode e.g., BPSK (Binary Phase Shift Keying), QPSK (Quadrature Phase Shift Keying), 8PSK (8 angles PSK), 16APSK (16 APSK), or 32 APSK (32 APSK). APSK refers to amplitude and phase shift keying. $C_r$ is an FEC (Forward Error Correction) coding rate such as ½, ⅔, ¾, ⅘, ⅚, ⅞, 9/10. Table 2 shows Target SNR values SNRTarget corresponding to modulation mode $M_q$ and FEC coding rates $C_r$. A gateway 160 computer 140 may store one set of data such as shown in example Table 2 for each beam footprint 150. A target SNR is a SNR required for a specified burst error rate such as 0.00001 or 0.001 to establish a satellite link. In one example, a baseline MODCOD may be any of the specified combinations shown in example Table 2.

TABLE

Error! No text of specified style in document.

| $M_q$ | $C_r$ | SNRTarget |
|---|---|---|
| QPSK | 1/2 | 3 |
| QPSK | 2/3 | 4.5 |
| QPSK | 4/5 | 6 |
| QPSK | 9/10 | 7.5 |
| 8PSK | 1/2 | 4.5 |
| 8PSK | 2/3 | 6.5 |
| 8PSK | 4/5 | 9 |
| 16APSK | 1/2 | 7 |
| 16APSK | 2/3 | 9 |
| 32APSK | 1/2 | 12 |

The computer 140 may be programmed to estimate the Inroute SNR $InrouteEsN0_{S_{bqseline}}$ needed for multiple locations 310 (specified with various azimuth, elevation combinations) across a footprint 150 for a lowest symbol rate $S_{baseline}$ deployed in the satellite 110 beam. For example, a lowest symbol rate could be any of 256 ksps, 512 ksps, 1.024 Msps, and 2.048 Msps.

With reference to Equation (18), the computer 140 may be programmed to calculate the difference in SNR between the estimated $InrouteEsN0_{S_{baseline}}$ and a target SNR TargetSNR of specified modulation $M_{baseline}$ and FEC coding rate $C_{baseline}$ so that all locations 310 in the footprint 150 can achieve the specified symbol rate. MODCOD (Modulation and Coding)

is defined as a combination of a modulation $M_{baseline}$ and a FEC coding rate $C_{baseline}$. The computer 140 may be programmed to choose baseline MODCOD and baseline symbol rate $S_{baseline}$ such that the back-off for the baseline symbol rate and Modcod, $BO_{baseline}(Az, El)$ for all locations (Az, EL) in the beam footprint 150 are greater than or equal to zero (0).

$$BO_{baseline}(Az,EL)=\text{InrouteEsN0}_{S_{baseline}}(Az,EL)-\text{TargetSNR}_{M_{baseline}C_{baseline}} \quad (18)$$

A computer 140 of, e.g., the gateway 160, the satellite 110, etc., may be programmed to actuate a set of terminals 120 to perform ranging with the satellite 110, to receive ranging data from the terminals 120, to update the fitted curve P based on the received ranging data from the terminals 120, and to transmit data specifying the updated fitted curve, e.g., parameters $p_1$, $p_2$, $p_3$, via the satellite 110 beam to the terminals 120.

For example, the gateway 160 computer 140 may be programmed to determine back-off table values (e.g., Table 2) by initiating ranging in at least some terminals 120 at different locations 310 in the footprint 150 to perform ranging and determine respective back-off values $y_j$. These terminals 120 may perform ranging at the baseline symbol rate $S_{baseline}$ and baseline MODCOD with an initial back-off value of zero (0). Upon completion of ranging in the selected terminals 120 and receiving the respective back-off values and location data, the gateway 160 computer 140 may determine the back-off table BOT and broadcast the back-off table BOT to each of the terminals 120 in the beam footprint 150.

A computer 140 of a terminal 120 may be programmed, upon receiving a request from the gateway 160 to perform ranging, to determine an initial power back-off value $y_t$ for establishing a communication link to the satellite 110 based on (i) the received data, e.g., the parameters $p_1$, $p_2$, $p_3$, specifying the fitted curve P, and (ii) a distance $d_t$ of a location of a satellite terminal 120 antenna within a satellite beam footprint 150 from a specified reference point 300 within the satellite beam footprint 150, and to initiate communication with the satellite 110 based on the determined initial power back-off value $y_t$.

A terminal 120 may have (i) an inactive, or (ii) an active, operation state. In an active operation state, a terminal 120 performs operations which should not be interrupted such as downloading media data, e.g., video playback, upload or download of audio or video data for providing telephony communications, etc. In an inactive operation state an interruption of terminal 120 operation will not cause any interruption of user interaction. Actuating a terminal 120 to perform ranging in an active operation state typically results in an interruption of terminal 120 operation, e.g., interrupting a phone call. Thus, in one example, the gateway 160 computer 140 may be programmed to select for ranging terminals 120 that are in inactive operation state. In other words, the gateway 160 computer 140 first determines an operation state of the terminals 120 in the footprint 150, and then selects a number of terminals 120 with an inactive operation state to perform ranging. In one example, the gateway 160 computer 140 may determine a terminal 120 to be inactive upon determining that the respective terminal 120 has not provided any bandwidth allocation.

Figure 5:
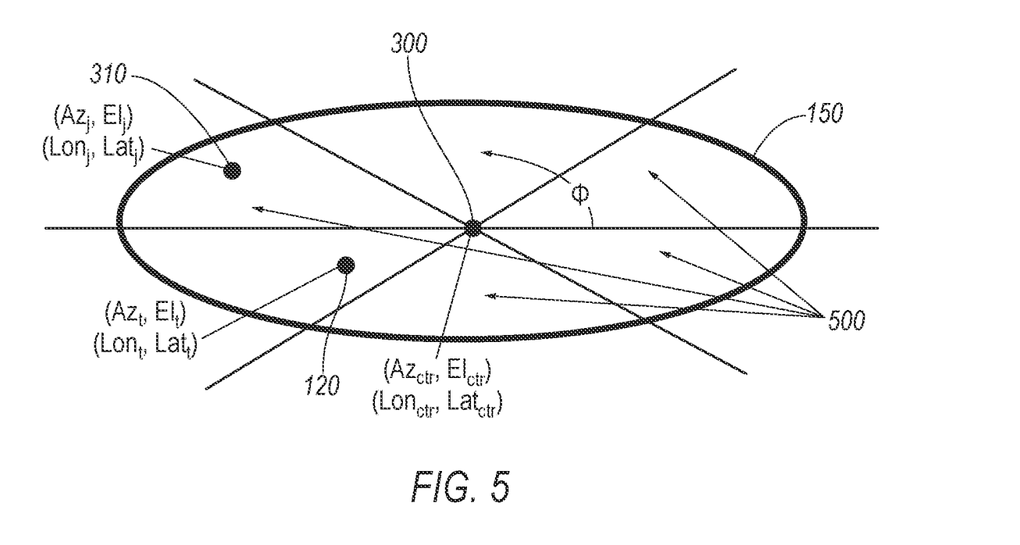
FIG. 5 illustrates a non-circular satellite beam footprint.

With reference to FIG. 5, a footprint 150 may have a non-circular shape, e.g., ovular. As shown in an example graph 600 in FIG. 6, in a non-circular footprint 150, the power back-off value $y_t$ of a terminal 120 may be based on additional parameters besides the distance $d_t$ from the footprint 150 reference point 150. A curve fitted to, e.g., graph 600, may provide a poor result, e.g., resulting in interference because of a wide variety of power back-off values when the value is determined only based on distance $d_t$. As discussed below, a scheme with both distance $d_t$ and direction $\phi_t$ can provide better accuracy with non-circular beam footprints 150.

Figure 6:
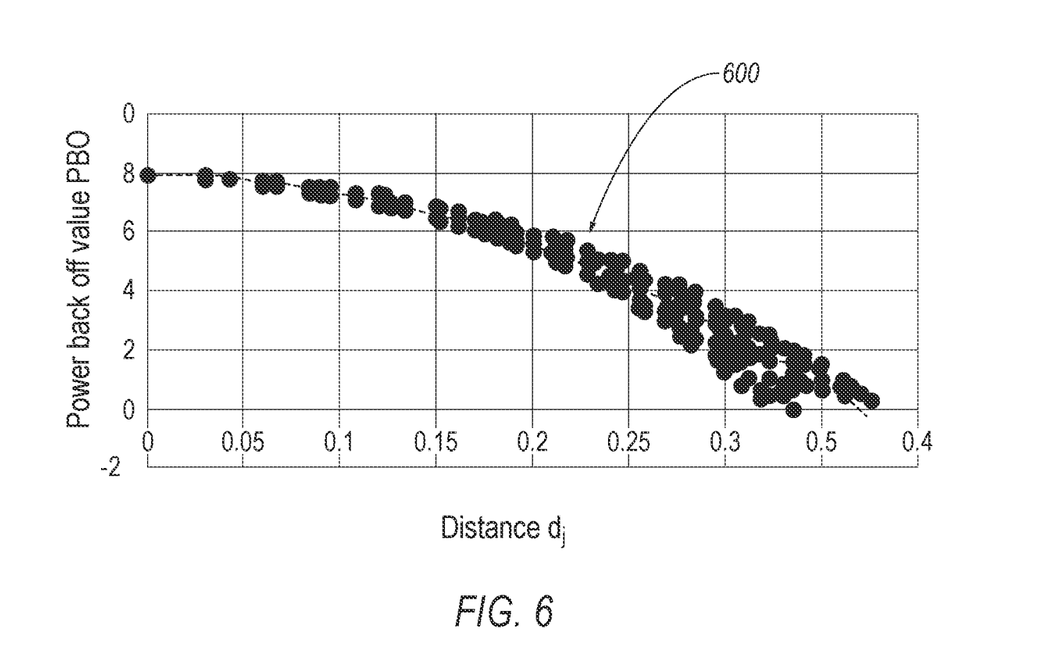
FIG. 6 is a graph of power back-off values versus a terminal distance to a center of a non-circular satellite beam footprint.

With reference to FIGS. 5-6, the gateway 160 computer 140 may be programmed to identify (as explained further below) multiple sectors 500 within the satellite beam footprint 150, and to determine a fitted curve P of power back-off value $y_t$ for each of the sectors 500. The satellite beam footprint 150 encompasses multiple non-overlapping sectors 500, e.g., sectors of an ovular footprint 150. Additionally or alternatively, the sectors 500 may have any other shapes and/or the footprint 150 may be divided into non-overlapping sectors 500 which have different dimensions and/or shapes. The computer 140 may be programmed to determine a fitted curve P of power back-off value for each of the sectors 500, and to determine a power back-off value $y_t$ for the terminal 120 location based on the respective fitted curve P of the sector 500 in which the terminal 120 antenna is located.

The computer 140 may be programmed to determine a first fitted curve P for a first area 600 based on a first set of stored data and a second fitted curve P for a second sector 500 based on a second set of stored data. Table 3 shows exemplary data specifying direction range and parameters $p_1$, $p_2$, $p_3$ for m sectors 500. For example, any location 310 located between direction angles $\Phi_1$ and $\Phi_2$ is within the first sector 500. The computer 140 may be programmed to determine the number m of sectors 500 such that each sector 500 can have one fitted curve P, e.g., 4 or 8 sectors 500. In the present context, a sector 500 can be fit with one curve when a back off value of each location within the sector 500 can be estimated using the fitted curve with an error less than a specified threshold, e.g., 0.1 dB. A number m and/or shape of sectors 500 may be determined based on a shape of the footprint 150 and/or a system co-channel interference that is interference in the same frequency channel caused due to transmitters in other beams.

TABLE 3

| Sector | Direction range | $p1_k$ | $p2_k$ | $p3_k$ |
|---|---|---|---|---|
| 1 | $\Phi_1 < \Phi_k < \Phi_2$ | $p1_1$ | $p2_1$ | $p3_1$ |
| 2 | $\Phi_1 < \Phi_k < \Phi_3$ | $p1_2$ | $p2_2$ | $p3_2$ |
| ... | ... | | | |
| n | $\Phi_n < \Phi_k < \Phi_1$ | $p1_n$ | $p2_n$ | $p3_n$ |

In one example, the sectors 500 may be identified as uniformly spaced across the footprint 150. If there are 'm' different uniform sectors 500, after each $\phi=2\pi/m$ direction there is one set of parameters $p_1$, $p_2$, $p_3$ for a quadratic equation for each of the sectors 500. As shown in FIG. 6, when m=6, six sets of parameters $p_1$, $p_2$, $p_3$ should be specified to cover the sectors 500. The footprint 150 may be divided into a first sector 500 formed by 0 to 60 degrees of the footprint 150, a second sector 500 formed between 60 and 120 degrees, etc.

The computer 140 may be programmed to implement Equations (19)-(20) to determine a distance $d_t$ of a terminal 120 location from the reference point 300 and an angle $\phi_t$ of the terminal 120 location based on the location coordinates $az_{ctr}$, $el_{ctr}$ of the reference point 300 and the location coordinates $az_t$, $az_t$ of the terminal 120 location.

$$\phi_t = \tan^{-1}\frac{(el_t - el_{ctr})}{(az_t - az_{ctr})} \quad (19)$$

$$d_t = \sqrt{(az_t - az_{ctr})^2 + (el_t - el_{ctr})^2} \quad (20)$$

The computer 140 may be programmed to identify a terminal 120 sector 500 (i.e., in which sector 500 of the footprint 150 the terminal 120 is located) based on the determined direction angle $\phi_t$ of the terminal 120. The computer 140 may be programmed to identify $j^{th}$ sector 500 of the footprint 150 where $$\min_{k \in N}(\phi_t - \phi_k),$$

i.e., a terminal 120 angle $\phi_t$ to be within bounds of particular sector 500, e.g., if the terminal angle is less than $\phi_2$ and greater than $\phi_1$, then the terminal is in first sector 500.

Upon determining the sector 500 of the terminal 120, the computer 140 may be programmed to identify the respective parameters $p1_j$, $p2_j$, $p3_j$. The computer 140 may be programmed to implement Equation (21) to determine the power back-off value $y_t$ for the terminal 120. The computer 140 may be programmed to implement Equation (17) to determine the power back-off value $\text{backoff}_{S_pM_qC_r}$, as discussed above with respect to Equation (17).

$$y_t = p1_j r_t^2 + p2_j r_t + p3_j) \quad (21)$$

Figure 7:
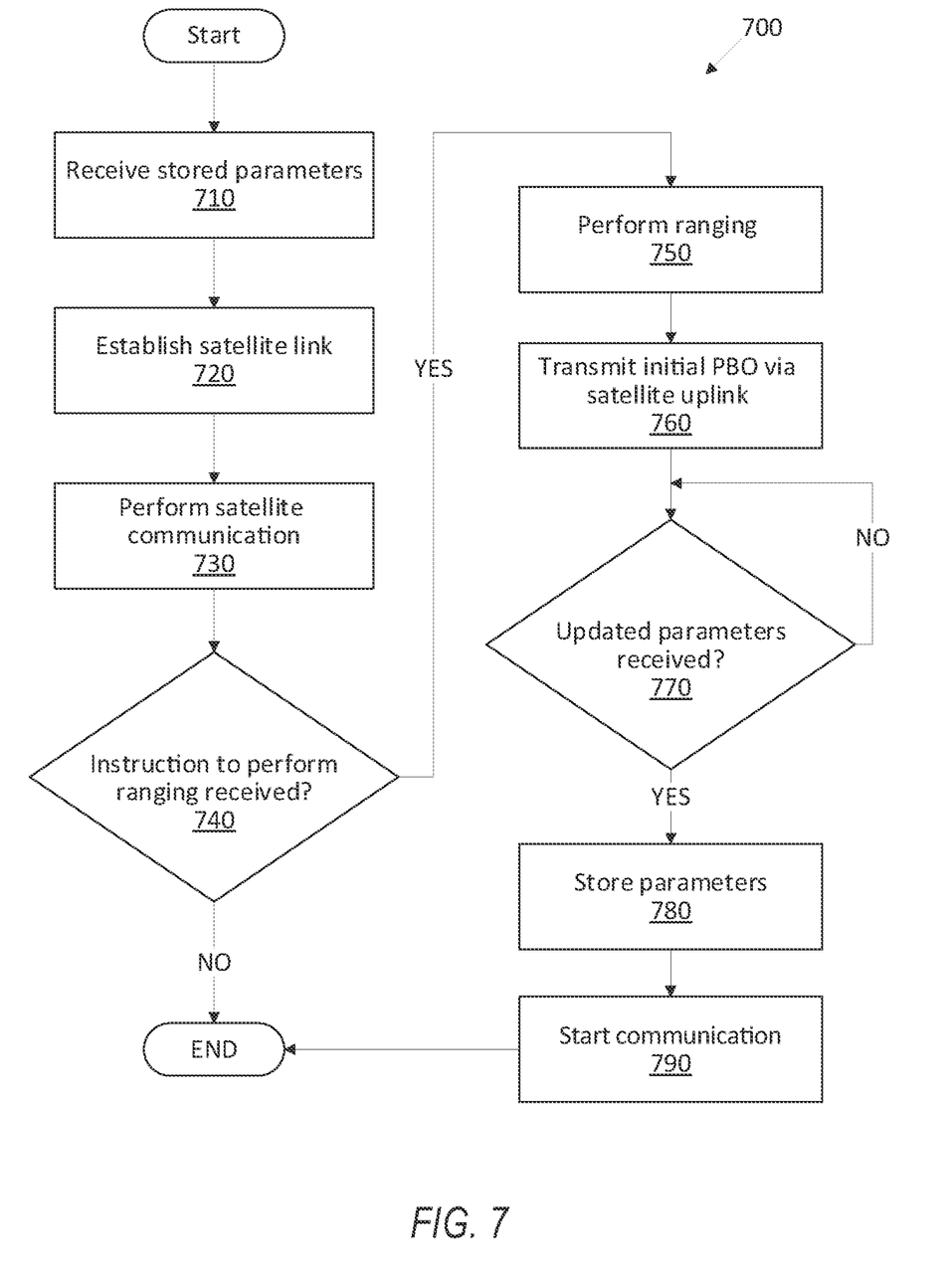
FIG. 7 is an exemplary flow of a process for operating a satellite terminal.

FIG. 7 is an exemplary flow diagram illustrating a process 700 for operating a satellite terminal. A terminal 120 computer 140 may be programmed to execute blocks of the process 700.

The process 700 begins in a block 710, in which the terminal 120 computer 140 receives stored parameters for establishing a satellite communication link with the satellite 110. For example, e.g., when the terminal 120 is located within a circular-shaped footprint 150, the computer 140 may store parameters $p_1$, $p_2$, $p_3$ specifying a fitted curve, e.g., as specified in Equation (13b). Additionally or alternatively, the computer 140 may store an initial power back-off value PBO specific to the terminal 120 location. In another example, e.g., when the terminal 120 is located within a non-circular footprint 150 (FIG. 5), the computer 140 may store parameters $p1_j$, $p2_j$, $p3_j$ such as shown in exemplary Table 3 specifying a fitted curve for each of the sectors 500 of the non-circular footprint 150, e.g., Equation (21).

Next, in a block 720, the computer 140 establishes a satellite link with the satellite 110 based on the stored data. In one example, the computer 140 may be programmed to implement Equations (13b) and/or (21) to determine the initial power back-off value $y_t$ for the terminal 120 and establish a communication link based on the determined initial power back-off value $y_t$. The computer 140 may be further programmed to determine the power back-off value $\text{backoff}_{S_pM_qC_r}$ as discussed with respect to Equation (17).

Next, in a block 730, the computer 140 operates the terminal 120 to perform satellite communication, e.g., download or upload audio and/or video data.

Next, in a decision block 740, the computer 140 determines whether an instruction to perform ranging is received. If the computer 140 determines that the instruction to perform ranging is received, then the process 700 proceeds to a block 750; otherwise the process ends, or alternatively returns to the block 710, although not shown in FIG. 7.

In the block 750, the computer 140 performs ranging to establish a communication link with the satellite. Thus, the computer 140 may determine the initial power back-off value $y_t$ for the terminal 120. In some examples, an initial power back-off value $y_t$ may be stored in the computer 140; however, upon performing the ranging process, the initial power back-off value may be updated (i.e., changed) due to an environmental condition such as a weather condition.

Next, in a block 760, the computer 140 transmits the initial PBO via satellite uplink, e.g., to a satellite gateway 160.

Next, in a decision block 770, the computer 140 determines whether updated parameters, e.g., parameters $p_1$, $p_2$, $p_3$ specifying a fitted curve for a circular footprint 150 or parameters $p1_j$, $p2_j$, $p3_j$ for a non-circular footprint 150 is received. If the computer 140 determines that parameters $p_1$, $p_2$, $p_3$ or parameters $p1_j$, $p2_j$, $p3_j$ are received, then the process 700 proceeds to a block 780; otherwise, the process 700 returns to the decision block 770 or alternatively ends, although not shown in FIG. 7.

In the block 780, the computer 140 stores the received parameters $p_1$, $p_2$, $p_3$ for a circular footprint 150 or parameters $p1_j$, $p2_j$, $p3_j$ for a non-circular footprint 150.

Next, in a block 790, the computer 140 initiates communication with the satellite 100, e.g., upload and/or download of media data begins. As discussed above, instead of transmitting at maximum power level of the terminal 120 during ranging process to establish a communication link with the satellite 110 the ranging is initiated based on the stored fitted curve thereby advantageously preventing undesirable interference during ranging process. Following the block 790, the process 700 ends or alternatively returns to the block 710, although not shown in FIG. 7.

Figure 8A:
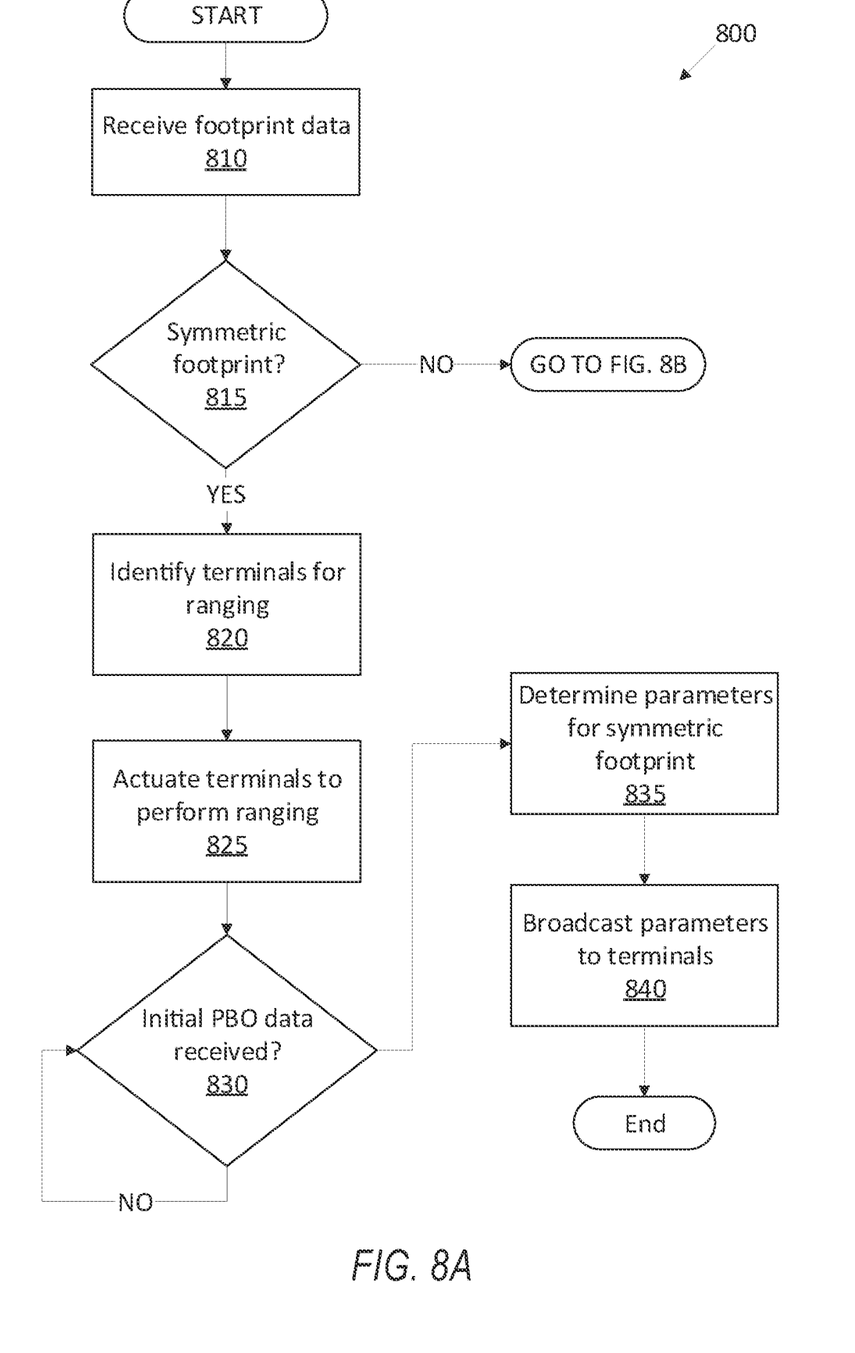
FIGS. 8A-8B are an exemplary flowchart of a process for operating the satellite gateway.
Figure 8B:
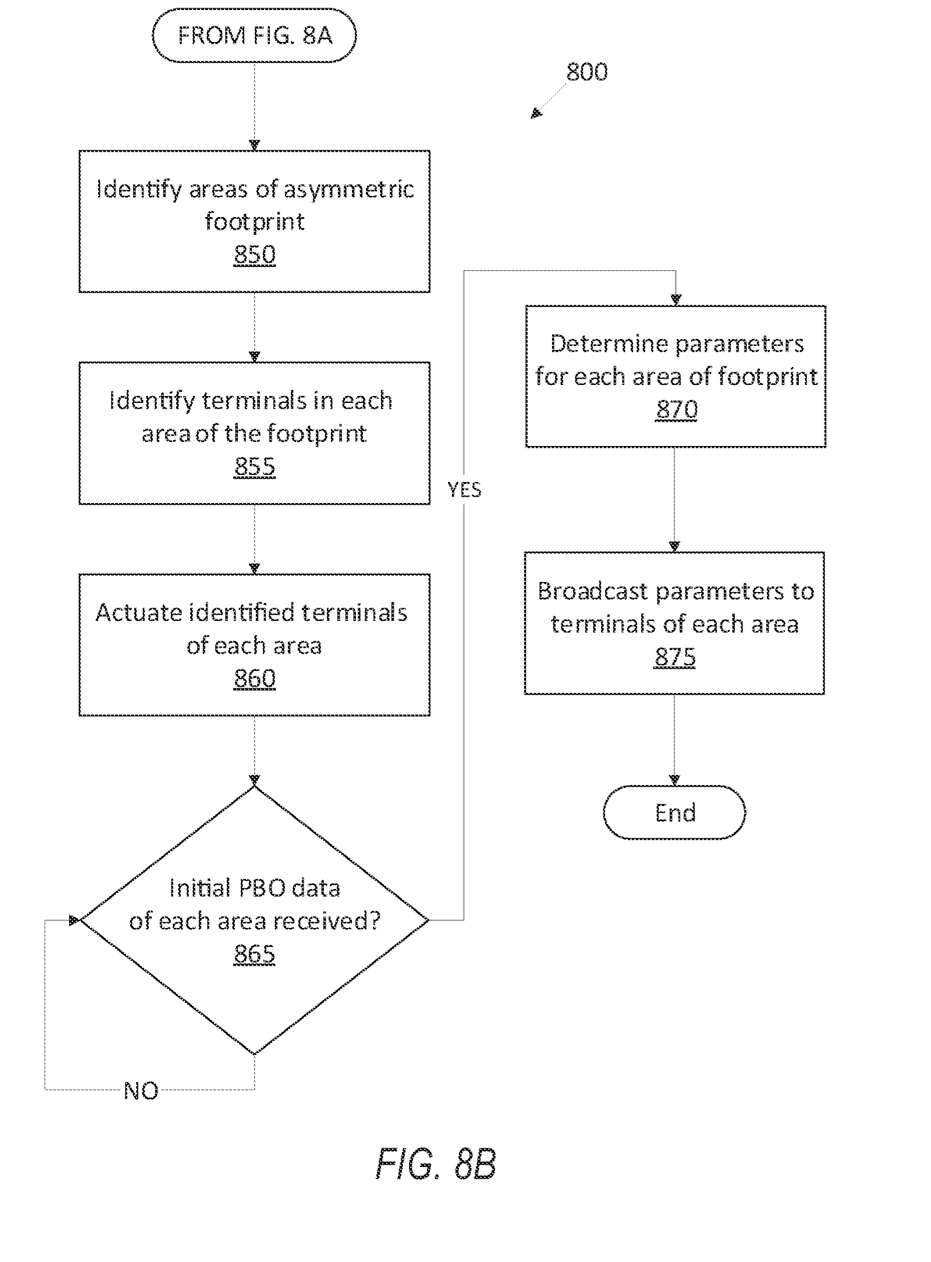

FIGS. 8A-8B are an exemplary flowchart of a process 800 for operating the satellite gateway. A computer 140 in the satellite network 100, e.g., a gateway 160 computer 140, a satellite 110 computer 140, etc., may be programmed to execute the blocks of the process 800. Although the discussion of the process 800 below refers to one footprint 150, the process 800 may be repeated to operate for a coverage area 130 including multiple beam footprints 150.

With reference to FIG. 8A, the process 800 begins in a block 810, in which the computer 140 receives footprint 150 data. The computer 140 may store data specifying geographical location coordinates of the beam footprints 150. Further, the computer 140 may store a back-off table BOT such as example Table 2.

Next, in a decision block 815, the computer 140 determines whether the footprint 150 is circular. The computer 140 may store data specifying whether the footprint 150 is circular. If the computer 140 determines that the footprint 150 is circular, then the process 800 proceeds to a block 820; otherwise the process 800 proceeds to a block 850 (FIG. 8B).

In the block 820, the computer 140 identifies terminals 120 for ranging. The computer 140 may be programmed to identify multiple terminals 120 in an inactive operate state. The computer 140 may be programmed to identify terminals 120 in locations 310 at various distances $d_j$ (FIG. 3), e.g., near center point 300, near or on a perimeter (or edge) of the footprint 150, and locations 310 between the perimeter and center point 300.

Next, in a block 825, the computer 140 actuates terminals 120 to perform ranging. The computer 140 may send via the satellite 110 instructions to the terminals 120 to perform ranging. For example, the instructions may include location coordinates $Az_j$, $El_j$ and/or identifier data of the identified terminals 120.

Next, in a decision block 830, the computer 140 determines whether initial power back-off data is received from the terminals 120. The computer 140 may receive initial power back-off data $PBO_j$ from the terminals 120. If the computer 140 determines that the initial power back-off data $PBO_j$ is received, then the process 800 proceeds to a block 835; otherwise the process 800 returns to the decision block 830.

In the block 835, the computer 140 determines parameters for circular footprint 150. The computer 140 may be programmed to implement Equations (14)-(15) to fit a curve based on the received data thereby determining the parameters $p_1$, $p_2$, $p_3$. Alternatively, in one example, a gateway 160 computer 140 may store or receive link budget data and determine the parameters $p_1$, $p_2$, $p_3$ based on the pre-calculated link budget data. Thus, the block 835 may be reached from the decision block 815.

Next, in a block 840, the computer 140 broadcasts the determined parameters $p_1$, $p_2$, $p_3$ to the terminals 120 in the footprint 150. Following the block 840, the process 800 ends, or alternatively returns to the block 810, although not shown in FIG. 8A.

With reference to FIG. 8B, in the block 850, the computer 140 identifies sectors 500 of the non-circular footprint 150. For example, the computer 140 may be programmed to divide the footprint 150 to m sectors, as discussed with respect to FIG. 5. The computer 140 may be programmed to determine data specifying the sectors 500, e.g., as shown in exemplary Table 3.

Next, in a block 855, the computer 140 identifies one or more terminals 120 in each sector 500 of the footprint 150. In one example, the computer 140 is programed to identify three or more terminals 120 in each of the identified sectors 500. The computer 140 may identify the terminals 120 for each sector 500 based on the terminal 120 location and the data specifying the sectors 500, (see, e.g., Table 3) by determining that a terminal 120 location is within a respective sector 500 boundary.

Next, in a block 860, the computer 140 actuates the identified terminals 120 of each sector 500. The computer 140 may be programmed to transmit instructions to perform ranging.

Next, in a decision block 865, the computer 140 determines whether initial power back-off data $PBO_j$ is received from each of the actuated terminals 120 sectors 500. In some examples, the computer 140 may be programmed to determine that the initial power back-off data $PBO_j$ is received from the terminals 120 upon determining that at least a specified percentage, e.g., 80%, of actuated terminals 120 provided the respective initial power back-off data $PBO_j$. If the initial power back-off data $PBO_j$ is received from the terminals 120 of the sectors 500, then the process 800 proceeds to a block 870; otherwise the process 800 returns to the decision block 865.

In the block 870, the computer 140 determines parameters for each sector 500 of the footprint 150 based on the respective received initial power back-off data $PBO_j$ of the sector 500. The computer 140 may be programmed to implement Equations (14)-(15) to determine the parameters $p1_j$, $p2_j$, $p3_j$ for each of the sectors 500. Alternatively, in one example, a gateway 160 computer 140 may store or receive link budget data and determine the parameters $p_1$, $p_2$, $p_3$ based on the pre-calculated link budget data. Thus, the block 835 may be reached from the decision block 815.

Next, in a block 875, the computer 140 broadcasts parameters $p1_j$, $p2_j$, $p3_j$ to terminals 120 of each sector 500. For example, for a footprint 150 having 6 sectors 500, the computer 140 broadcast 6 sets of parameters $p1_j$, $p2_j$, $p3_j$ in addition to data specifying the sectors 500 such as shown in exemplary Table 3.

Following the block 875, the process 800 ends, or alternatively returns to the block 810, although not shown in FIGS. 8A-8B.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, network devices such as a gateway or terminal, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer-readable media associated therewith (e.g., disks, memories, etc.). A computer program product may comprise such instructions stored on computer-readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A terminal computer, comprising a processor and a memory, the memory storing instructions executable by the processor to:
   determine an initial power back-off value for a satellite terminal to establish a communication link from the satellite terminal to a satellite as a function of a distance of a location of an antenna of the satellite terminal within a satellite beam footprint from a specified reference point within the satellite beam footprint; and
   initiate communication with the satellite based on the determined initial power back-off value.

2. The terminal computer of claim 1, wherein the instructions further include instructions to determine the initial power back-off value based on stored data including (i) distances from the specified reference point, and (ii) respective power back-off values, for a plurality of locations within the satellite beam footprint.

3. The terminal computer of claim 2, wherein the instructions further include instructions to:
   determine a fitted curve having (i) a first axis specifying a distance of each location from the reference point within the satellite beam footprint, and (ii) a second axis specifying a respective power back-off value; and
   determine the initial power back-off value based on the determined fitted curve.

4. The terminal computer of claim 3, wherein the instructions further include instructions to:
   determine the distance from the reference point within the satellite beam footprint; and
   determine the power back-off value for the satellite terminal based on the fitted curve and the determined distance from the reference point.

5. The terminal computer of claim 1, wherein the instructions further include instructions to:
   update the power back-off value for the satellite terminal based on an environmental condition including a weather condition; and
   upon establishing the satellite communication link, provide the updated power back-off value to a satellite gateway.

6. The terminal computer of claim 1, wherein the instructions further include instructions to:
   store a first set of data including (i) location coordinates and (ii) respective power back-off values, for a plurality of first locations within a first area within the satellite beam footprint and a second set of data including (i) location coordinates and (ii) respective power back-off values, for a plurality of second locations within a second area within the satellite beam footprint;
   upon determining that the antenna of the satellite terminal is located within the first area, determine the initial power back-off value based on the first set of stored data.

7. The terminal computer of claim 1, wherein the instructions further include instructions to:
   identify a plurality of non-overlapping sectors within the satellite beam footprint, wherein the satellite beam footprint encompasses the plurality of non-overlapping sectors;
   determine a respective fitted curve of power back-off value for each of the plurality of sectors; and
   determine a power back-off value for the location based on the respective fitted curve of the sector in which the antenna of the satellite terminal is located.

8. The terminal computer of claim 7, wherein the instructions further include instructions to determine a first fitted curve for the first sector based on the first set of stored data and a second fitted curve for the second sector based on the second set of stored data.

9. A system comprising a satellite gateway, including a processor and a memory, the memory storing instructions executable by the processor to:
receive ranging data from a plurality of satellite terminals on Earth, data including a power back-off value and a location of each of the satellite terminals, wherein the plurality of satellite terminals are located within a satellite beam footprint;
determine a distance of each of the locations from a reference point of the satellite beam footprint;
determine a fitted curve having (i) a first axis specifying a distance of each location from the reference point within the satellite beam footprint, and (ii) a second axis specifying a respective power back-off value; and
transmit data specifying the fitted curve via the satellite beam.

10. The system of claim 9, wherein the instructions further include instructions to:
actuate a second plurality of satellite terminals to perform ranging with the satellite;
receive ranging data from the second plurality of satellite terminals;
update the fitted curve based on the received ranging data from the second plurality of satellite terminals; and
transmit data specifying the updated fitted curve via the satellite beam.

11. The system of claim 10, wherein the instructions further include instructions to select the second plurality of terminals upon determining that each of the second plurality of terminals are in an inactive operation status.

12. The system of claim 9, further comprising a satellite terminal within the satellite beam footprint, programmed to:
determine an initial power back-off value for establishing a communication link to the satellite based on (i) the received data specifying the fitted curve, and (ii) a distance of a location of a satellite terminal antenna within a satellite beam footprint from a specified reference point within the satellite beam footprint; and
initiate communication with the satellite based on the determined initial power back-off value.

13. The system of claim 9, wherein the instructions further include instructions, upon determining a non-circular shape of the satellite beam footprint, identify a plurality of sectors within the satellite beam footprint, and determine a respective fitted curve of power back-off value for each of the plurality of sectors.

14. A method, comprising:
determining an initial power back-off value for establishing a communication link from a satellite terminal to a satellite as a function of a distance of a location of an antenna of the satellite terminal within a satellite beam footprint from a specified reference point within the satellite beam footprint; and
initiating communication with the satellite based on the determined initial power back-off value.

15. The method of claim 14, further comprising determining the initial power back-off value based on stored data including (i) distances from the specified reference point, and (ii) respective power back-off values, for a plurality of locations within the satellite beam footprint.

16. The method of claim 15, further comprising:
determining a fitted curve having (i) a first axis specifying a distance of each location from the reference point within the satellite beam footprint, and (ii) a second axis specifying a respective power back-off value; and
determining the initial power back-off value based on the determined fitted curve.

17. The method of claim 16, further comprising:
determining the distance from the reference point within the satellite beam footprint; and
determining the power back-off value for the satellite terminal based on the fitted curve and the determined distance from the reference point.

18. The method of claim 14, further comprising:
Updating the power back-off value for the satellite terminal based on an environmental condition including a weather condition; and
upon establishing the satellite communication link, providing the updated power back-off value to a satellite gateway.

19. The method of claim 14, further comprising:
storing a first set of data including (i) location coordinates and (ii) respective power back-off values, for a plurality of first locations within a first area within the satellite beam footprint and a second set of data including (i) location coordinates and (ii) respective power back-off values, for a plurality of second locations within a second area within the satellite beam footprint;
upon determining that the antenna of the satellite terminal is located within the first area, determining the initial power back-off value based on the first set of stored data.

20. The method of claim 14, further comprising:
identifying a plurality of non-overlapping sectors within the satellite beam footprint, wherein the satellite beam footprint encompasses the plurality of non-overlapping sectors;
determining a respective fitted curve of power back-off value for each of the plurality of sectors; and
determining a power back-off value for the location based on the respective fitted curve of the sector in which the antenna of the satellite terminal is located.

* * * * *